(12) United States Patent
Kunduru et al.

(10) Patent No.: US 11,652,733 B2
(45) Date of Patent: May 16, 2023

(54) MEDIA ROUTE HANDLING

(71) Applicant: Arista Networks, Inc., Santa Clara, CA (US)

(72) Inventors: Charanjith Reddy Kunduru, Santa Clara, CA (US); Sudip Regmi, San Ramon, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 105 days.

(21) Appl. No.: 17/105,042

(22) Filed: Nov. 25, 2020

(65) Prior Publication Data
US 2022/0166704 A1 May 26, 2022

(51) Int. Cl.
*H04L 45/16* (2022.01)
*H04L 45/00* (2022.01)
*H04L 45/021* (2022.01)
*H04L 41/08* (2022.01)
*H04L 49/201* (2022.01)

(52) U.S. Cl.
CPC .............. *H04L 45/16* (2013.01); *H04L 41/08* (2013.01); *H04L 45/021* (2013.01); *H04L 45/34* (2013.01); *H04L 49/201* (2013.01)

(58) Field of Classification Search
CPC ..... H04L 45/16; H04L 49/201; H04L 49/203; H04L 41/08; H04L 45/34; H04L 45/021
See application file for complete search history.

(56) References Cited

U.S. PATENT DOCUMENTS

| | | | | |
|---|---|---|---|---|
| 7,529,199 | B1 * | 5/2009 | Wijnands | H04L 45/00 370/256 |
| 8,085,755 | B2 * | 12/2011 | Shepherd | H04L 45/16 370/351 |
| 8,509,056 | B1 * | 8/2013 | Arya | H04L 45/02 370/216 |
| 9,172,550 | B2 * | 10/2015 | Kapur | H04L 12/1886 |
| 9,264,295 | B1 * | 2/2016 | Sherwood | H04L 45/04 |
| 9,749,221 | B2 * | 8/2017 | Banavalikar | H04L 49/70 |
| 10,264,040 | B2 * | 4/2019 | Manohar | H04L 45/16 |
| 10,404,571 | B2 * | 9/2019 | Chen | H04L 45/02 |
| 10,812,373 | B2 * | 10/2020 | Chen | H04L 45/42 |

(Continued)

OTHER PUBLICATIONS

Nguyen, Kim-Khoa, and Brigitte Jaumard. "Distributed control plane architecture of next generation IP routers." In 2009 IEEE International Conference on Cluster Computing and Workshops, pp. 1-8. IEEE, 2009. (Year: 2009).*

*Primary Examiner* — Patrice L Winder
(74) *Attorney, Agent, or Firm* — Fountainhead Law Group P.C.

(57) ABSTRACT

Techniques for operating a networking switch in two broadcast networks are provided. In some embodiments, the switch may instantiate a first controller client and a second controller client in a control plane of the switch; register the first controller client with a first broadcast controller associated with a first broadcast network; and register the second controller client with a second broadcast controller associated with a second broadcast network. The switch may further receive a first multicast route through the first controller client; receive a second multicast route through the second controller client; and program at least one of the first multicast route and the second multicast route into a multicast routing information base.

20 Claims, 9 Drawing Sheets

(56) References Cited

U.S. PATENT DOCUMENTS

| | | | |
|---|---|---|---|
| 10,892,984 B1* | 1/2021 | Statton | H04L 45/02 |
| 2006/0002391 A1* | 1/2006 | Takihiro | H04L 45/00 |
| | | | 370/390 |
| 2011/0302320 A1* | 12/2011 | Dunstan | H04L 69/22 |
| | | | 370/252 |
| 2013/0322437 A1* | 12/2013 | Raszuk | H04L 45/04 |
| | | | 370/389 |
| 2014/0157298 A1* | 6/2014 | Murphy | H04L 61/5007 |
| | | | 725/110 |
| 2017/0187763 A1* | 6/2017 | Hsu | H04L 65/4076 |
| 2018/0131568 A1* | 5/2018 | Manickam | H04L 45/20 |

* cited by examiner

725 PROCESS MULTICAST ROUTES

- 725A: ADD DATA TO MULTICAST ROUTE FOR VLAN
- 725B: RECONCILE MULTICAST ROUTE WITH IGMP SNOOPING STATE

730 IDENTIFY AND RESOLVE CONFLICTS

- 730A: MERGE MULTICAST ROUTES
- 730B: SELECT ONE MULTICAST ROUTE OVER OTHER(S) BASED ON RANKING/PRIORITY
- 730C: SELECT ONE MULTICAST ROUTE OVER OTHER(S) BASED ON BANDWIDTH

FIG. 7B

MEDIA ROUTE HANDLING

BACKGROUND

Broadcasters multicast audio-visual traffic over broadcast networks. The broadcast networks may be separated into multiple broadcast domains. Typically, each broadcast domain includes sources, receivers, switches, and a broadcast controller that are separate from other broadcast domains.

In situations where multiple broadcast domains carry the same media (to provide redundancy for fault tolerance), the media source is shared among the broadcast domains. However, some media sources have only one output that can be connected to a switch, and the switch can be in only one broadcast domain.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 7A and 7B illustrate a flow diagram of an example method for operating a switch.

DETAILED DESCRIPTION

Overview

The present disclosure describes systems and techniques for operating a switch in multiple broadcast networks. Typically, a switch is configured to communicate with one broadcast controller and participates in only one broadcast network. Embodiments of the present technology enable a switch to work with multiple broadcast controllers, so that it appears to each broadcast controller that the switch is exclusively in that broadcast controller's domain.

In accordance with some embodiments, a supervisor running on the CPU in the switch's control plane may instantiate multiple client controllers, one for each broadcast domain. Each client controller has an exclusive relationship with a broadcast controller. The client controllers receive multicast routes from their respective broadcast controllers. The supervisor evaluates the multicast routes for conflicts before they are programmed into the multicast routing table. For some conflicts, the multicast routes are merged. When merging is not possible, the broadcast controllers may be ranked and their routes given precedence by order of their rankings.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 1:
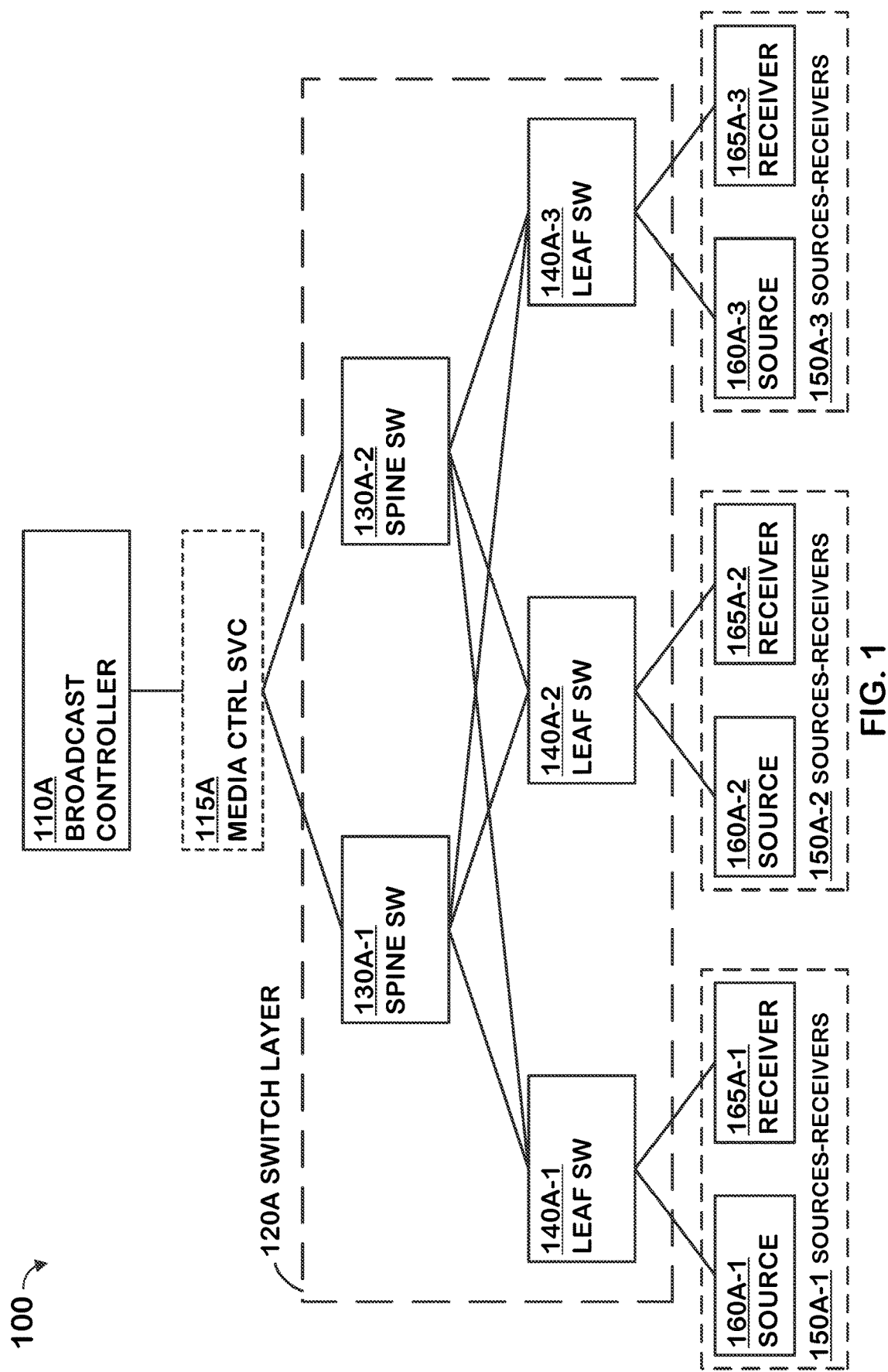
FIG. 1 illustrates an example broadcast network.

FIG. 1 illustrates example broadcast network 100 according to some embodiments. Broadcast network 100 may be used to carry (or stream) audiovisual (AV) media from a source to multiple receivers. Broadcast network 100 may include broadcast controller 110A, optional media control service 115A, switch layer 120A, and sources-receivers 150A-1 through 150A-3.

Sources-receivers 150A-1 may include source 160A-1 and receiver 165A-1. Sources-receivers 150A-2 may include source 160A-2 and receiver 165A-2. Sources-receivers 150A-3 may include source 160A-3 and receiver 165A-3. Although one receiver and one source are shown for sources-receivers 150A-1 through 150A-3, sources-receivers 150A-1 through 150A-3 may have multiple sources and/or multiple receivers. As used herein, "and/or" indicates either or both of the two stated possibilities. An additional network(s) not depicted in FIG. 1—such as various combinations of a mobile broadband network, internet service provider (ISP) network, Wi-Fi network, residential router, local area network (LAN), and the like—may be between switch layer 120A and sources-receivers 150A-1 through 150A-3.

Sources 160A-1 through 160A-3 may be media input sources, streaming devices, and the like. By way of non-limiting example, sources 160A-1 through 160A-3 may be various combinations and permutations of a microphone, video camera, server provisioning pre-recorded AV media, and the like. Receivers 165A-1 through 165A-3 may be media output devices. By way of further non-limiting example, receivers 165A-1 through 165A-3 may be a smart phone, tablet computer, notebook computer, desktop computer, (smart) television, and the like. Sources 160A-1 through 160A-3 and receivers 165A-1 through 165A-3 may be referred to as endpoints.

Switch layer 120 may be a wide area network (WAN) including multiple networking devices, such as switches. As shown, switch layer 120 has a spine-leaf (or leaf-spine) topology/architecture, although it will be appreciated that other configurations may be used in other embodiments. A spine-leaf topology is a two-layer network topology composed of leaf switches (leaf switches 140A-1 through 140A-3) and spine switches (spine switches 130A-1 and 130A-2). As shown, the leaf switches (leaf switches 140A-1 through 140A-3) may be connected to the sources-receivers (sources-receivers 150A-1 through 150A-3) and the spine switches (spine switches 130A-1 and 130A-2) may be connected to the leaf switches.

The leaf switches in a spine-leaf topology may connect with every switch in the network fabric. This offers redundancy and a media stream/broadcast may still be routed when a spine switch goes down. A source (or receiver) crosses the same number of switches when it connects to a receiver (or source), except when the source and receiver are on the same leaf switch. The spine-leaf topology advantageously minimizes latency and bottlenecks, because each media stream/broadcast travels to a spine switch and another leaf switch to reach the receiver.

Other network topologies may be used. For example, switch layer 120A may have a three-layer topology, hub-spoke topology, single layer/device topology, and the like. In instances where switch layer 120A has a topology other than spine-leaf, spine switches 130A-1 and 130A2, and leaf switches 140A-1 through 140A-3, in this and subsequent figures, may be referred to as just switches. Although two spine switches and three leaf switches are shown, greater numbers of spine switches and/or leaf switches—having network connectivity consistent with the network topology employed in switch layer 120A—may be used.

A media provider (e.g., television network, video streaming service, video conference service, and the like) may disseminate AV media over broadcast network 100. The media provider—or a network operator provisioning broadcast network 100 as a service to the media provider—may configure broadcast network 100 using broadcast controller 110A. Broadcast controller 110A may be a program/application running on a server, virtual machine (or other virtualization technology, such as a container) in a cloud computing environment, and the like. Broadcast controller 110A has network connections to the constituents of switch layer 120A and to optional media control service 115A. The media provider (or operator) may provide, to broadcast controller 110A, a list of switches in broadcast network 100 (switch layer 120A) and media sources and receivers (sources-receivers 150A-1 through 150A-3). Typically, the switches in switch layer 120A may communicate with one of broadcast controller 110A (and optionally one of media control service 115A).

Broadcast controller 110A may optionally communicate with the constituents of switch layer 120A through media control service 115A. Media control service 115A may be a program/application running on a server, virtual machine (or other virtualization technology, such as a container) in a cloud computing environment, and the like. Media control service 115A may have network connections to broadcast controller 110A and the switches of switch layer 120A. Media control service 115A may provide a single interface for broadcast controller 110A to interact with the switches of switch layer 120A. For example, media control service 115A may communicate with the switches in switch layer 120A (as specified by the media provider), to query to which other switches the switch is connected (e.g., neighborship information), to which endpoints (e.g., sources and/or receivers) the switch is connected (where applicable), the state of the switch (e.g., port status, UP/DOWN, etc.), and the like. Media control service 115A may receive and collect responses from the switches. It will be appreciated that in other embodiments the functionality of media control service 115A may be incorporated in broadcast controller 110A.

Media control service 115A may use the information gathered from the switches in switch layer 120 to calculate multicast routes through switch layer 120A, from sources to receivers specified by the media provider or operator. Suppose, for example, a media provider specifies that source 160A-1 is active (providing/streaming AV media) and receiver 165A-3 should receive the broadcast from source 160A-1. Broadcast controller 110A communicates the source and destination to media control service 115A. In response, media control service 115A may formulate a flow/path for the broadcast comprised of multicast routes. For example, the media control service may formulate a path that goes from source 160A-1 to leaf switch 140A-1, from leaf switch 140A-1 to spine switch 130A-2 (hereinafter multicast route 1), and from spine switch 130A-2 to leaf switch 140A-3, (hereinafter multicast route 2), and from leaf switch 140A-3 to receiver 165A-3 (hereinafter multicast route 3). Media control service 115A may further identify multicast route 1, multicast route 2, and multicast route 3, and that the three routes are to be programmed into leaf switch 140A-1, spine switch 130A-2, and leaf switch 140A-3, respectively. Media control service 115A may then determine multicast routes that optimize bandwidth in broadcast network 100.

Multicast routing is a networking method for efficient distribution of one-to-many traffic. A leaf switch may send a single copy of data to a single multicast address, which is then distributed to a group of switches. Although one receiver was used in the above simplified example, multiple receivers may have a network connection to the leaf switches (leaf switches 140A-1 through 140A-3) and receive the broadcast. Suppose multiple instances of receiver 165A-2 have a network connection to leaf switch 140A-2 and multiple instances of receiver 165A-3 have a network connection to leaf switch 140A-3. Suppose further that the media provider specifies to broadcast controller 110 that source 160A-1 is active and that the receivers on leaf switches 140A-2 and 140A-3 will receive the stream/broadcast. Broadcast controller 110 may determine multicast routes as follows. Spine switch 130A-1 may send a multicast route to leaf switches 140A-2 and 140A-3. Leaf switch 140A-2 may send a multicast route to multiple receivers 165A-2. Leaf switch 140A-3 may send a multicast route to multiple receivers 165A-3. Media control service 115A may provide the determined multicast routes to the respective switches in switch layer 120A.

Legacy and Shared Sources-Receivers

Figure 2:
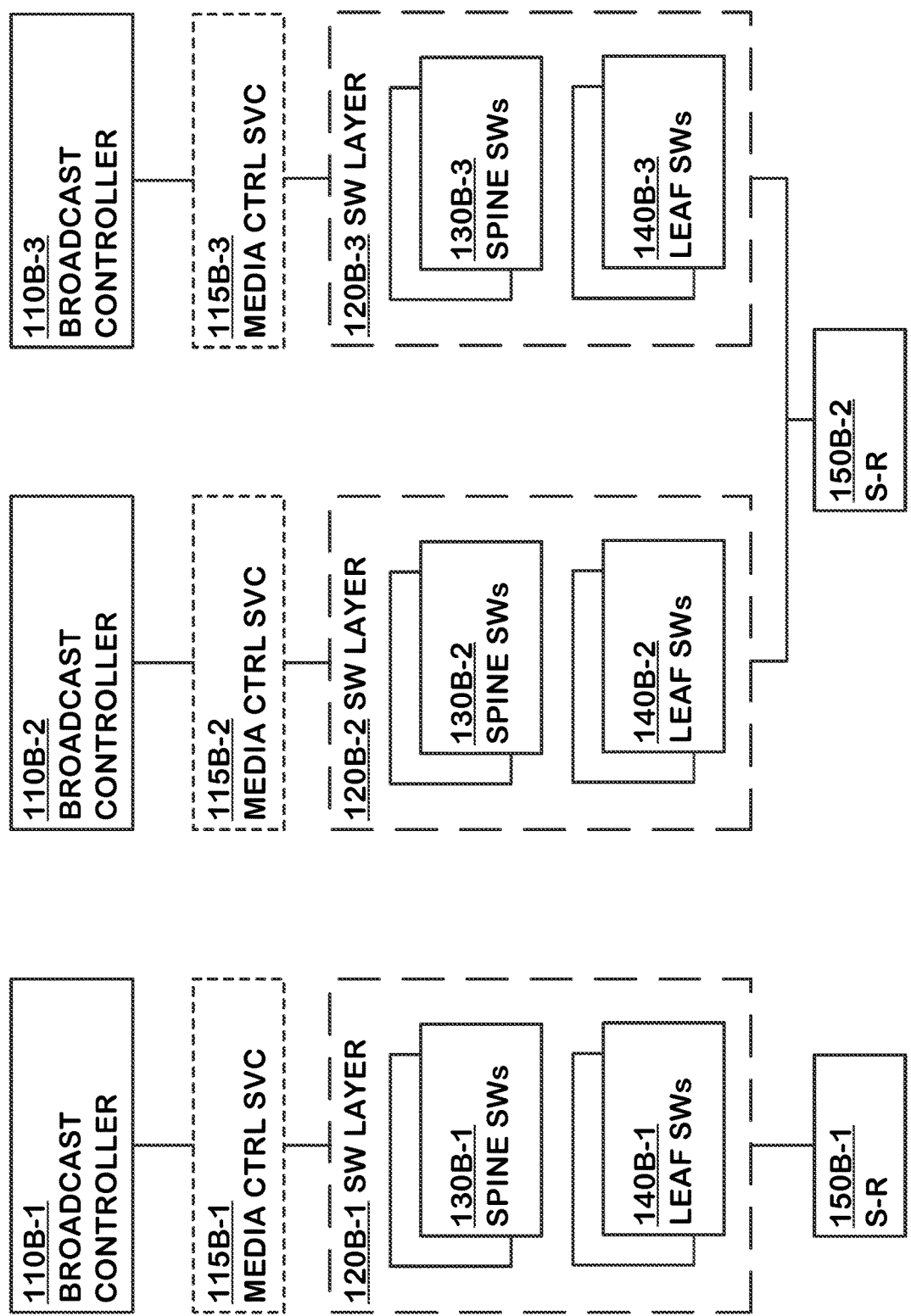
FIG. 2 illustrates additional examples of broadcast networks.

FIG. 2 illustrates broadcast networks 200 in accordance with various embodiments. Broadcast controllers 110B-1 through 110B-3 may be examples of broadcast controller 110A shown in FIG. 1. Likewise, media control services 115B-1 through 115B-3 may be examples of media control service 115A. Switch layers 120B-1 through 120B-3 may be examples of switch layer 120A. Sources-Receivers 150B-1 through 150B-3 may be examples of sources-receivers 150A-1 through 150A-3.

Broadcast networks 200 may include three broadcast controllers 110B-1 through 110B-3. Broadcast controller 110B-1 manages a broadcast network including optional media control service 115B-1, switch layer 120B-1, and sources-receivers 150B-1. Switch layer 120B-1 includes spine switches 130B-1 and leaf switches 140B-1. Broadcast controller 110B-2 manages a broadcast network including optional media control service 115B-2, switch layer 120B-2, and sources-receivers 150B-2. Switch layer 120B-2 includes spine switches 130B-2 and leaf switches 140B-2. Broadcast controller 110B-3 manages a broadcast network including optional media control service 115B-3, switch layer 120B-3, and sources-receivers 150B-2. Switch layer 120B-3 includes spine switches 130B-3 and leaf switches 140B-3.

As shown, sources-receivers 150B-1 are in one broadcast network controlled by broadcast controller 110B-1. The broadcast network may also be referred to as a broadcast domain. A broadcast domain is an administrative grouping of multiple switches and endpoints, such as switch layer 120B-1 and sources-receivers 150B-1, respectively. A broadcast domain may be defined when the media provider (or operator) provides broadcast controller 110B-1 with the list of switches in switch layer 120A and media sources and receivers in sources-receivers 150B-1. Sources-receivers 150B-1 may include a source(s) that may communicate with only one leaf switch in switch layer 120B-1. These pre-existing sources may be referred to as legacy sources. Additionally or alternatively, sources-receivers 150B-1 may include a receiver(s) that may communicate with only one leaf switch in switch layer 120B-1. These pre-existing receivers can be referred to as legacy receivers. Legacy sources and/or legacy receivers may be old equipment with which the modern system of broadcast network 100 has to work. For example, the legacy source may be a microphone or camera that has only one output. In the event that the broadcast network is disrupted (e.g., broadcast controller 110B-1 goes down), the broadcast/stream from the source may be lost. In other words, the receivers in sources-receivers 150B-1 may not receive the broadcast/stream from the sources in sources-receivers 150B-1.

On the other hand, sources-receivers 150B-2 may communicate with two different broadcast domains, the broadcast network managed by broadcast controller 110B-2 and the broadcast network managed by broadcast controller 110B-3. For example, sources in sources-receivers 150B-2 may communicate with more than one leaf switch, for example both a leaf switch in leaf switches 140B-2 and a leaf switch in leaf switches 140B-3. Through this network connection to two leaf switches, sources in sources-receivers 150B-2 may generate two flows/paths, one through each broadcast domain. Because sources-receivers may be in two broadcast domains, when one broadcast domain goes down, the other may advantageously continue without interruption. Although, sources-receivers 150B-2 are shown to be in two broadcast networks, sources-receivers 150B-2 may be in more than two different broadcast networks.

Shared Switches

Figure 3:
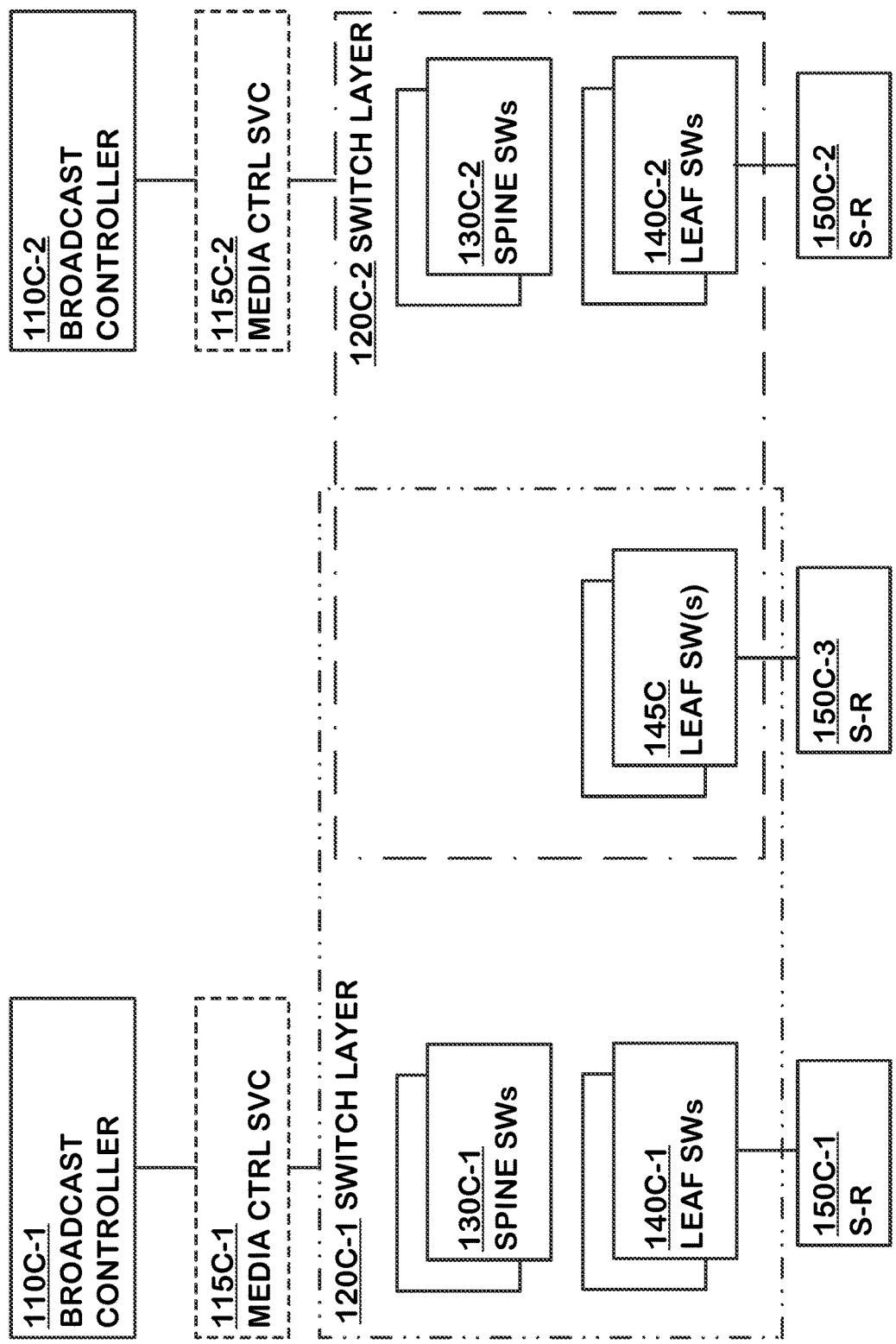
FIG. 3 illustrates another view of example broadcast networks.

It would be advantageous if the legacy source(s) (and legacy receiver(s)) in sources-receivers 150B-1 could enjoy the benefits of connecting to more than one leaf switch and hence more than one broadcast domain. One solution connects a leaf switch—which is connected to a legacy source(s) and/or legacy receiver(s)—to multiple broadcast domains. In this way, the legacy source(s) and/or legacy receiver(s) is(are) connected to multiple broadcast domains through this leaf switch. FIG. 3 illustrates broadcast networks 300, where two different broadcast domains share a leaf switch.

Broadcast controller 110C-1 and 110C-2 may be examples of broadcast controller 110A. Media control service 115C-1 and 115C-2 may be examples of media control service 115A. Switch layers 120C-1 and 120C-2 may include at least some of the characteristics of switch layer 120A. Spine switches 130C-1 and 130C-2 may be examples of spine switches 130A-1 through 130B-3. Leaf switches 140C-1 and 140C-2 may be examples of leaf switches 140B-1 and 140B-2. Sources-receivers 150C-1 through 150C-3 may be examples of sources-receivers 150A-1 through 150A-3 and sources-receivers 150B-1 through 150B-3.

Broadcast networks 300 include two broadcast networks, one corresponding to broadcast controller 110C-1 and one corresponding to broadcast controller 110C-2. The broadcast domain associated with broadcast controller 110C-1 includes optional media control service 115C-1, switch layer 120C-1, sources-receivers 150C-1, and sources-receivers 150C-3. The broadcast domain associated with broadcast controller 110C-2 includes optional media control service 115C-2, switch layer 120C-2, sources-receivers 150C-2, and sources-receivers 150C-3. At least some of the sources and/or receivers in sources-receivers 150C-1 may also be in sources-receivers 150C-2, and vice versa.

Leaf switch 145C is a part of both switch layer 120C-1 and switch layer 120C-2. Hence, leaf switch 145C is a part of both the broadcast domain managed by broadcast controller 110C-1 and the broadcast domain managed by broadcast controller 110C-2. For example, leaf switch 145C receives multicast routes from both broadcast controller 110C-1 and broadcast controller 110C-2.

Even though leaf switch 145C is depicted as being in two broadcast domains, leaf switch 145C may be in two or more broadcast domains. Although leaf switch 145C is depicted as a leaf switch, leaf switch 145C may alternatively be a spine switch (where the switch layers have a spine-leaf network topology). Moreover, there may be leaf switches and/or spine switches that are a part of two different broadcast network domains.

Figure 4:
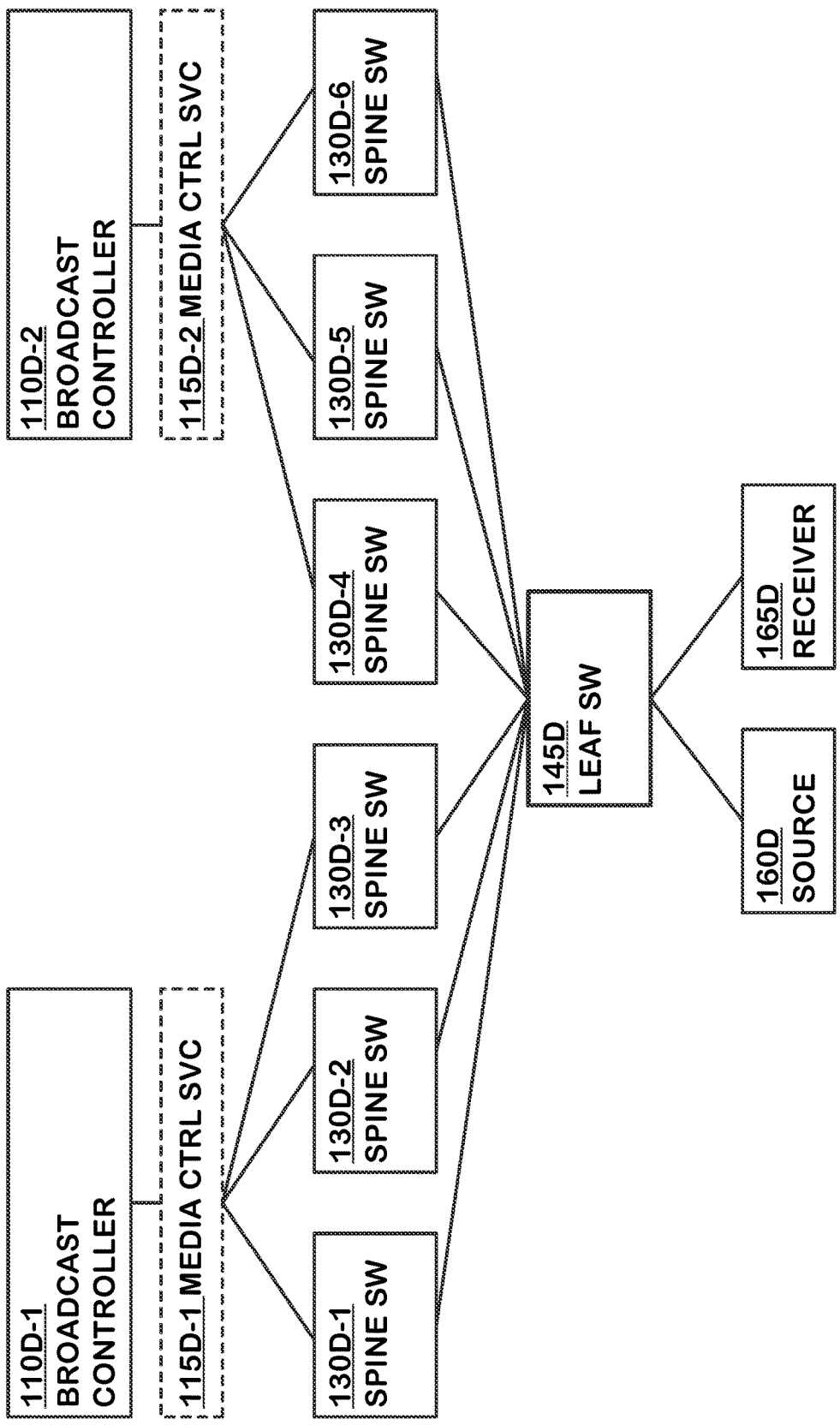
FIG. 4 illustrates a further view of example broadcast networks.

FIG. 4 depicts broadcast networks 400 according to some embodiments. FIG. 4 is a further illustration of two different broadcast domains sharing a leaf switch. Broadcast controller 110D-1 and 110D-2 may be examples of broadcast controller 110A. Media control services 115D-1 and 115D-2 may be examples of media control service 115A. Spine switches 130D-1 through 130D-6 may be examples of spine switches 130A-1 and 130A-2. Leaf switch 145D may be an example of leaf switch 145C. Source 160D and receiver 165D may have at least some of the characteristics of sources 160A-1 through 160A-3 and receivers 165A-1 through 165A-3, respectively.

Similar to FIG. 3, broadcast networks 400 may include two broadcast networks, one broadcast network associated with broadcast controller 110D-1 and one broadcast network associated with broadcast controller 110D-2. The broadcast network associated with broadcast controller 110D-1 may include optional media control service 115D-1, spine switches 130D-1 through 130D-3, leaf switch 145D, source 160D, and receiver 165D. The broadcast domain associated with broadcast controller 110D-2 may include optional media control service 115D-2, spine switches 130D-4 through 130D-6, leaf switch 145D, source 160D, and receiver 165D.

As illustrated, leaf switch 145D may be included in both the broadcast domain associated with broadcast controller 110D-1 and broadcast controller 110D-2. For example, source 160D and/or receiver 165D may be a legacy source and/or receiver, respectively. Recall that legacy sources and receivers may only connect to one switch, so it is leaf switch 145D that connects to more than one broadcast domain. Leaf switch 145D receives multicast routes from both broadcast controller 110D-1 and broadcast controller 110D-2. To bring a media broadcast/stream from source 160D to more than one broadcast network, leaf switch 145D participates in more than one broadcast network. Leaf switch 145D sends flows from legacy source to spine switches 130D-1 through 130D-6 in two different broadcast domains. Alternatively or additionally, to bring a media broadcast/stream to receiver 165D from more than one broadcast network, leaf switch 145D is a part of more than one broadcast network. Leaf switch 145D receives flows from a legacy source to spine switches 130D-1 through 130D-6 in two different broadcast domains.

Because the legacy source and/or receiver may still only connect to one leaf switch, it may appear that the leaf switch is a single point of failure. However, there are other technologies, such as Multi-Chassis Link Aggregation (MLAG), that may add physical diversity to the shared leaf switch. MLAG enables two switches to act like a single switch, the two switches providing redundancy.

Although six spine switches 130D-1 through 130D-6, one leaf switch 145D, one source 160D, and one receiver 165D are depicted, a smaller or larger number of (various permutations and combinations of) spine switches, leaf switches, sources, and receivers may be used. For pictorial clarity, other elements of the broadcast networks, such as additional leaf switches, sources, and receivers, are omitted.

Figure 5:
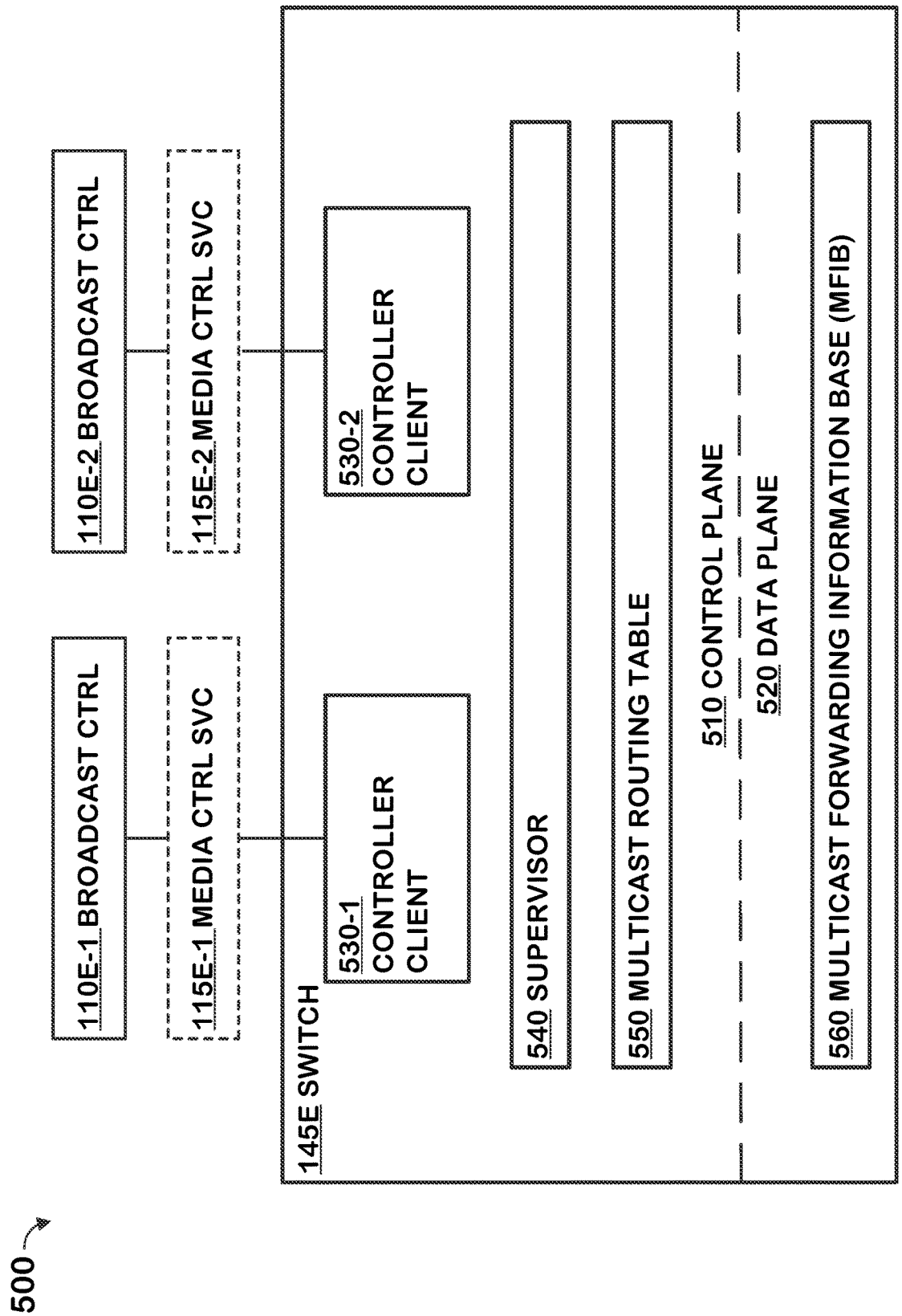
FIG. 5 illustrates a block diagram of an example networking device.

FIG. 5 depicts a simplified block diagram of system 500 according to some embodiments. System 500 may include broadcast controllers 110E-1 and 110E-2, optional media control services 115E-1 and 115E-2, and switch 145E. Broadcast controllers 110E-1 and 110E-2 are examples of broadcast controller 110A. Optional media control services 115E-1 and 115E-2 are examples of media controller service 115A. Switch 145E may be an example of leaf switches 145C and 145D.

Switch 145E includes control plane 510 and data plane 520 (sometimes referred to as a forwarding plane). Control plane includes controller clients 530-1 and 530-2, supervisor 540, and multicast routing table 550. Data plane 520 may include multicast forwarding information base (MFIB) 560. Generally, control plane 510 may determine how packets should be forwarded, such as by maintaining multicast routing table 550. Data plane 520 may actually forward the packets.

A multicast transmission may send internet protocol (IP) packets to a group of switches and/or endpoints on a broadcast network. To send information to a specific group, a multicast transmission may use a special form of IP destination address called an IP multicast group address. The IP multicast group address is specified in the IP destination address field of the packet. To multicast IP information, data plane 520 may forward an incoming IP packet to all output network interfaces that lead to members of the multicast group. Multicast routes received from broadcast controllers 110E-1 and 110E-2 may be used to populate multicast routing table 550. Multicast routing table 550 may be a data table that lists the routes to multicast groups. In data plane 520, MFIB 560 may be a forwarding engine that formats routes from multicast routing table 550 for protocol-independent hardware packet forwarding and adds them to a hardware forwarding information base (FIB). The hardware FIB may be used to forward multicast packets, such as for finding the proper output network interfaces for incoming multicast packets.

As shown, broadcast controller 110E-1 and/or optional media control service 115E-1 may communicate with control plane 510 using controller client 530-1. Likewise, broadcast controller 110E-2 and/or optional media control service 115E-2 may communicate with control plane 510 using controller client 530-2. Other network devices, such as spine switches, may be between switch 145E and the broadcast controllers and/or optional media control services. Although two broadcast controllers and/or optional media control services (and associated controller client instances) are shown, more broadcast controllers and/or optional media control services (and associated controller client instances) may be used.

Controller clients 530-1 and 530-2 may be computer programs that are stored in a memory subsystem and executed by a central processing unit(s) (CPU(s)) in control plane 510. For example, controller clients 530-1 and 530-2 may be agents running on an operating system (operating system agents) that is executed by a CPU(s) in control plane 510. These and other hardware of switch 145E are described further in FIG. 8. Agents may be computer programs that perform various actions continuously and autonomously. A network operating system is a specialized operating system for switch 145E. For example, the network operating system may be Arista Extensible Operating System (EOS®), which is a fully programmable and highly modular, Linux-based network operating system. Controller clients 530-1 and 530-2 may be operating system agents, such as EOS® agents.

Controller clients may process commands from their respective broadcast controller and/or optional media control service, so that switch 145E appears to have an exclusive relationship with each broadcast controller. In other words, switch 145E—using controller clients—operates as if each the broadcast controller and/or optional media control service is the only one it works with and as if switch 145E participates in only one broadcast network.

Supervisor 540 may be another computer program that is stored in a memory subsystem and executed by a central processing unit(s) in control plane 510. For example, supervisor 540 may be an operating system agent, such as an EOS® agent. Supervisor 540 may create an instance of (instantiate) a controller client for each broadcast domain that switch 145E will be a part of. Supervisor 540 may also resolve conflicts among multicast routes before the multicast routes are stored in multicast routing table 560.

In contrast to a multicast transmission/stream, a unicast transmission/stream sends IP packets to a single recipient on a network. Control plane 510 exchanges network topology information with other switches and constructs routing tables (not shown in FIG. 5) using a suitable routing protocol. Routing protocols may be a software mechanism by which network switches and routers communicate and share information about the topology of the network, and the capabilities of each routing node. Routing protocols may include Enhanced Interior Gateway Routing Protocol (EIGRP), Routing Information Protocol (RIP), Open Shortest Path First (OSPF), Border Gateway Protocol (BGP), Label Distribution Protocol (LDP), and the like.

Broadcast Controller and/or Media Control Service Workflow

Figure 6:
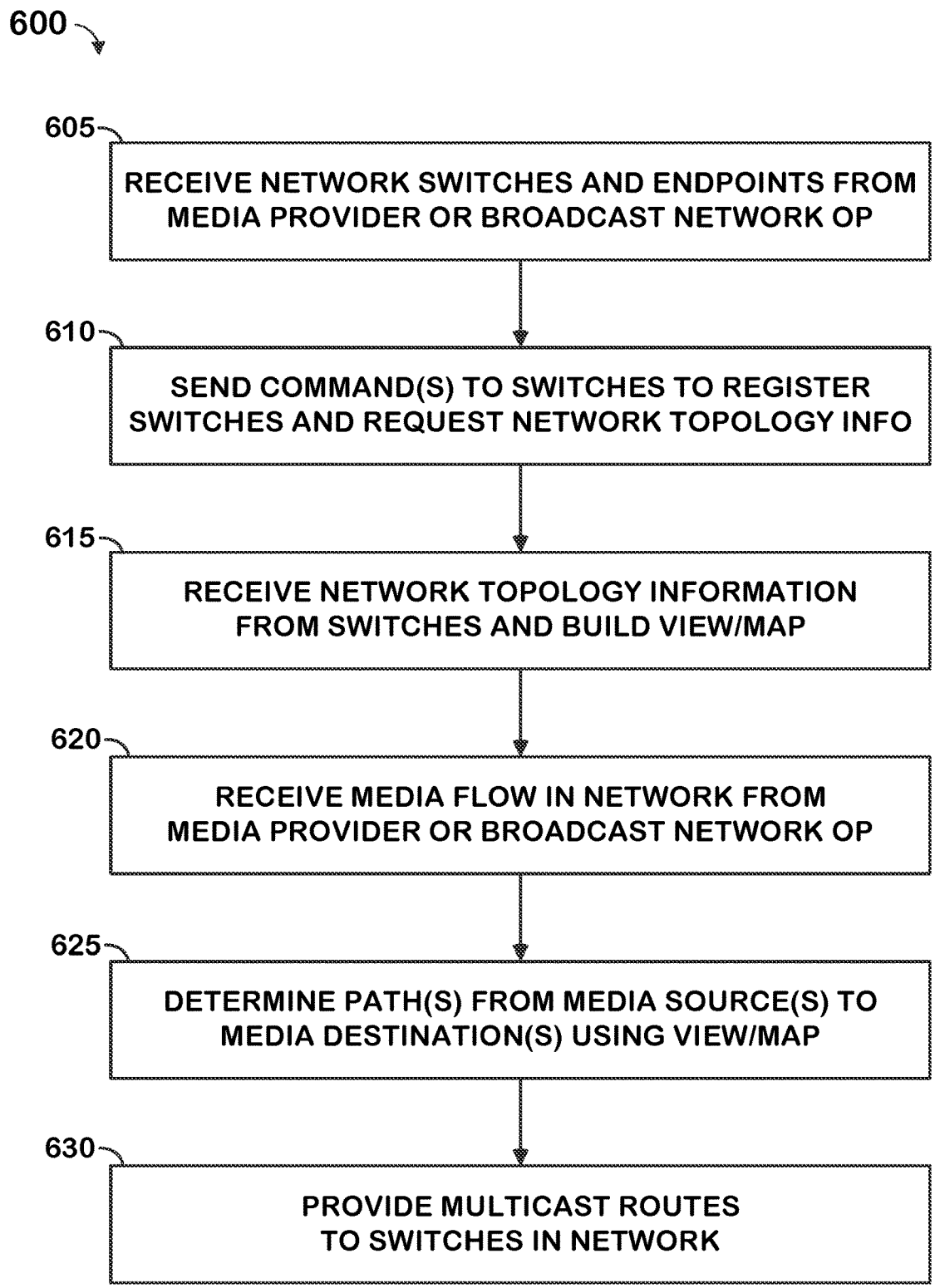
FIG. 6 illustrates a flow diagram of an example method for establishing routes.

FIG. 6 illustrates workflow 600 for establishing multicast routes according to some embodiments. Workflow 600 may be performed by broadcast controller 110A and/or media control service 115A. Because the broadcast controller and/or media control service cannot tell if it is communicating with a switch that is in one broadcast network (as is typical) or with a switch that is in multiple broadcast networks (as in the present technology), workflow 600 may be the same for each of these scenarios. Switches are described in FIGS. 5 and 8. Description of workflow 600 will be made with reference to FIG. 1, but FIGS. 2, 3, and 4 are also applicable.

Workflow 600 may commence at step 605, where a broadcast controller (broadcast controller 110A) may receive a list of switches (in switch layer 120A) and endpoints (sources-receivers 150A-1 through 150A-3) in the broadcast network (broadcast network 100) from a media provider or a network operator provisioning the broadcast network as a service to the media provider. For example, the media provider or network operator may send the list using the REpresentational State Transfer (REST) application program interface (API), a Hypertext Transfer Protocol (HTTP) API, and the like. The switches in the list of switches and endpoints may be constituent parts of switch layer 120A.

At step 610, the broadcast controller (broadcast controller 110A), optionally communicating through the media control service (media control service 115A), may send commands to the switches in the list of switches to register the switches with broadcast controller and/or media control service. For example, the broadcast controller or media control service may send commands through the switch's management network connection to a command line interface (CLI), configuring the switches to recognize the broadcast controller at a certain IP address and/or the media control service at another IP address. By way of further example, the broadcast controller and/or optional media control service may send commands by interacting with a command line interface (CLI) of the switches (in switch layer 120A), instructing the switches to send neighborship information, to which endpoints the switch is connected (if applicable), the state of the switch, and the like.

At step 615, the broadcast controller (broadcast controller 110A), optionally communicating via the media control service (media control service 115A), may receive network topology information from the switches. For example, the received information may be responsive to the query sent at step 610. The broadcast controller uses the received information to build a view/map of the broadcast network's (broadcast network 100) topology. For example, the map may include the quantity of switches in switch layer 120A, network interconnections between the switches, and the like. It will be appreciated that in the case of leaf switches 145C, 145D, and 145E, the leaf switch may provide information for switches and endpoints that are a part of different broadcast networks. However, the broadcast controller may only use topology information for switches and endpoints in the list (received at step 605) and ignore information for switches and endpoints that are not in the list.

At step 620, the broadcast controller (broadcast controller 110A) may receive a media flow for a group of switches from the media provider or the network operator. For example, the media provider or network operator may provide the media flow for a group using the REST API, a HTTP API, and the like. By way of further example, the media provider or network operator may specify the media flow for the group starts at interface 1 of leaf switch 140A-1 and ends at the receivers on interfaces 2 and 3 of leaf switch 140A-3.

At step 625, the media control service (media control service 115A) may use the network map (constructed at step 615) to determine a path through the broadcast network—from the media source to the media destination—for the media flow (received at step 620). For example, broadcast controller may choose spine switch 130A-2 to complete the media flow and calculate the multicast routes to go into the three switches (leaf switch 140A-1, spine switch 130A-2, and leaf switch 140A-3) in the path.

At step 630, the broadcast controller (broadcast controller 110A), optionally communicating through the media control service (media control service 115A), may provide the multicast routes to the switches in the path (determined at step 625). For example, the broadcast controller or media control service may send the multicast routes to leaf switch 140A-1, spine switch 130A-2, and leaf switch 140A-3. By way of further example, when leaf switch 140A-3 is an instance of leaf switch 145E, then a controller client instance associated with the broadcast network communicates with the broadcast controller and/or media control service and receives the multicast route.

Shared Switch Workflow

Figure 7A:
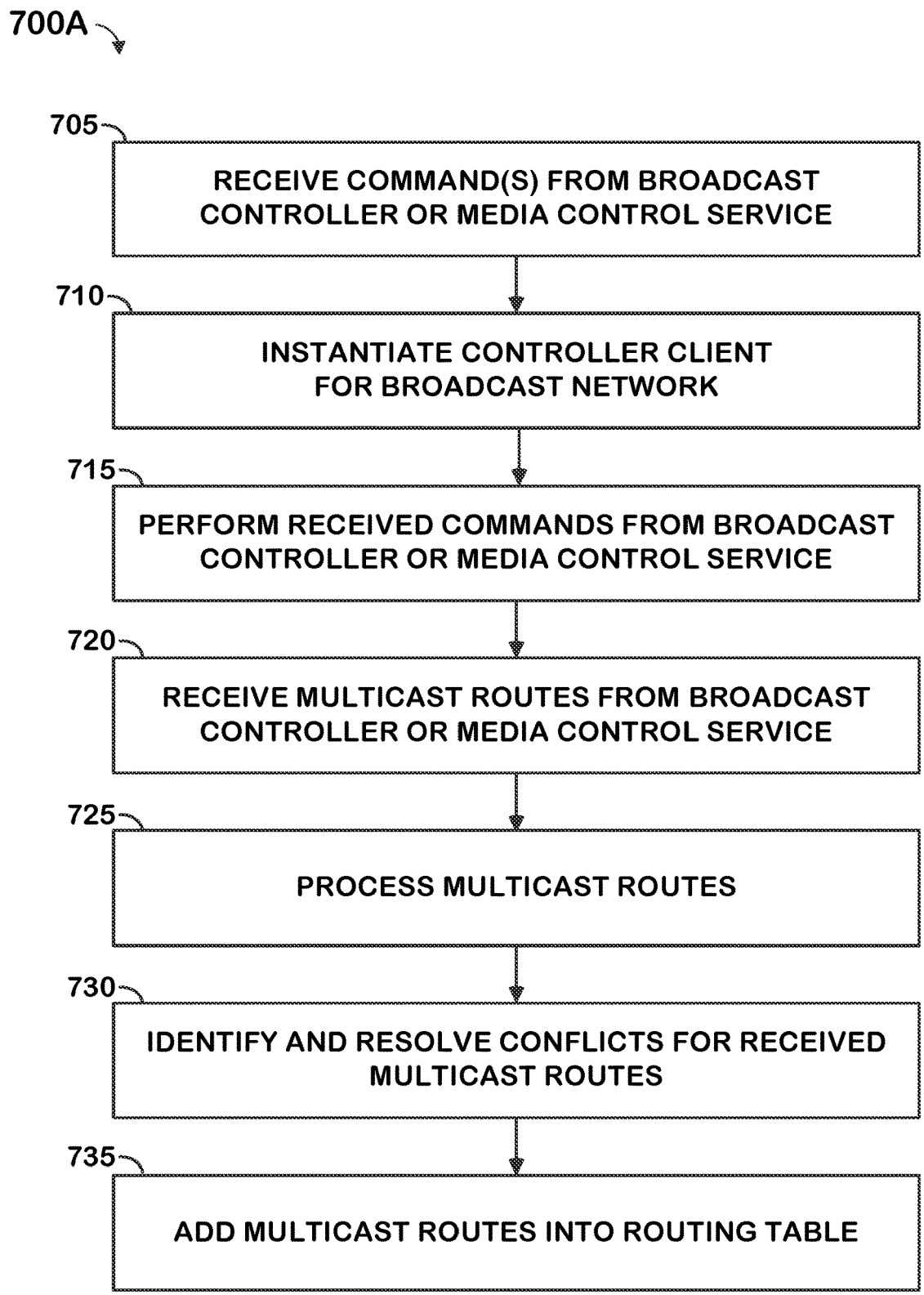

FIG. 7A illustrates workflow 700A for a shared switch, in accordance with various embodiments. Workflow 700A may be performed by switch 145E. For example, one or more programs stored in a memory subsystem and executed by a central processing unit(s) in control plane 510, such as a controller client (controller clients 530-1 and 530-2) and a supervisor (supervisor 540) may perform workflow 700A. Workflow 700A will be described with reference to FIG. 5. It will be appreciated that workflow 700A may be performed concurrently or sequentially, and by a supervisor and an instance of controller client for each broadcast domain of which switch 145E is a part.

Workflow 700A may commence at step 705 where switch 145E receives one or more commands from a broadcast controller (broadcast controller 110E-1 or 110E-2) or optional media control service (media control service 115E-1 or 115E-2). Switch 145E may receive, from the broadcast controller (broadcast controller 110E-1 or 110E-2) optionally communicating through the media control service (media control service 115E-1 or 115E-2), commands to register switch 145E with the broadcast controller and/or media control service. For example, switch 145E may receive the commands, through the switch 145Es management network connection to a command line interface (CLI), that configure the switch 145E to recognize the broadcast controller at a certain IP address and/or the media control service at another IP address. By way of further example, switch 145E may receive commands instructing the switch to send network topology information (neighborship information, to which endpoints the switch is connected (if applicable), etc.), the state of the switch, and the like. The commands may be received by supervisor 540.

When the command(s) are received at step 705, switch 145E may instantiate a client controller (client controller 530-1 or 530-2) to communicate with the broadcast controller or optional media control service that sent the command(s), at step 710. For example, supervisor 540 may create the instance of the client controller.

At step 715, switch 145E may perform the command(s) received at step 705. For example, the client controller (client controller 540-1 or 540-2) may register with the broadcast network, such as by configuring the client controller to recognize the command controller at a certain IP address and/or the optional media control service at another IP address. By way of further example, the client controller may send network topographical information, such as neighborship information, which endpoints the switch is connected to, the state of the switch, and the like to the broadcast controller (broadcast controller 110E-1 or 110E-2) or optional media control service (media control service 115E-1 or 115E-2).

At step 720, switch 145E may receive multicast routes from the broadcast controller (broadcast controller 110E-1 or 110E-2) or optional media control service (media control service 115E-1 or 115E-2). For example, the client controller (client controller 530-1 or 530-2) may receive the multicast routes. The multicast routes may have been determined at step 625 and provided at step 630 of workflow 600.

At step 725, switch 145E (client controller 540-1 or 540-2) may process the multicast routes received at step 720. Step 725 is described further in FIG. 7B.

At step 730, switch 145E (supervisor 540) may check for and resolve conflicts between the multicast routes received at step 720 and multicast routes received earlier, such as by other instances of the client controller for different broadcast networks. Additionally or alternatively, switch 145E (supervisor 540) may check for conflicts between collections of multicast routes already received. Typically, when a switch is in only one broadcast network, conflicts do not arise in the multicast routes from the broadcast controller. However, the multicast routes from multiple broadcast controllers may be incompatible.

The supervisor (supervisor 520) may maintain (store) the multicast routes received from the broadcast controllers (broadcast controllers 110E-1 and 110E-2). For example, supervisor 540 may store the routes received from broadcast controller 110E-1 separate from the routes received from broadcast controller 110E-2. The collection of routes maintained by the supervisor may be separate from the multicast routing table (multicast routing table 550).

To identify conflicts, the supervisor may compare multicast routes (collection A) for one broadcast domain (associated with broadcast controller 110E-1) with the multicast routes (collection B) in the other broadcast domain (associated with broadcast controller 110E-2). For example, the supervisor may search collection B for each multicast route in collection A. By way of further example, the key used to iteratively search through the collections may be a source-group pair, where source identifies the source of the broadcast/stream and the group identifies the multicast destination IP address (IP multicast group address). Alternatively or additionally, when a multicast route is received for one broadcast domain (associated with broadcast controller 110E-1), the collection for the other broadcast domain (associated with broadcast controller 110E-2) may be searched for that multicast route. Step 730 is also described further in FIG. 7B.

At step 735, switch 145E may add the (processed and conflict resolved) multicast routes to the routing table in the data plane. For example, supervisor 540 may update/program multicast routing table 550 with the multicast routes. Multicast forwarding information base (MFIB) 560 in data plane 520 may receive the multicast routes from multicast routing table 550, format the multicast routes for protocol-independent hardware packet forwarding, and add them to a hardware forwarding information base (FIB).

FIG. 7B provides further detail for steps 725 and 730 of FIG. 7A. Steps 725A and 725B, and 730A-730D may be performed sequentially, concurrently, and combinations thereof. At step 725, a client controller may process the multicast routes. For example, at step 725A the client controller (client controller 530-1 or 530-2) may add data when the multicast route goes through a virtual LAN (VLAN) and the like.

By way of further example, at step 725B the client controller may reconcile the multicast route with an Internet Group Management Protocol (IGMP) snooping state. The client controller monitors IGMP traffic on the network (switch layer) and uses what it learns to forward multicast traffic to only the downstream interfaces that are connected to interested receivers. Consider when a multicast route is directed to a VLAN with three interfaces (Ethernet1, Ethernet2, and Ethernet 3), but the IGMP snooping state indicates that only one interface (Ethernet1) is connected to an interested receiver and the other two (Ethernet2 and Ethernet3) are not. In this case, the multicast route will be changed to include Ethernet1 and omit Ethernet2 and Ethernet3. Switch 145E conserves bandwidth by sending multicast traffic only to interfaces connected to devices that want to receive the traffic, instead of flooding the traffic to all the downstream interfaces in a VLAN.

At step 730, supervisor 540 may resolve conflicts. Identifying conflicts was described in FIG. 7A. Suppose, for example, a media stream/broadcast from a legacy source ingresses switch 145E on interface 1. One broadcast controller may have a multicast route directing this media stream/broadcast to a spine switch in the broadcast controller's domain. Another broadcast controller may have a multicast route directing the same media stream/broadcast to a spine switch in another broadcast controller's domain. In this scenario, supervisor 540 may merge the two multicast routes so that switch 145E provides the media stream/broadcast to spine switches in both broadcast domains, at step 730A.

As another example of a conflict, suppose multiple media streams/broadcasts enter switch 145E through different interfaces; interfaces 1, 2, and 3 are connected to different sources. Multicast routes may be identified by a source and multicast group, where the source is a unicast IP address and the multicast group is an IP multicast group address. One broadcast controller provides a multicast route where a particular group ingresses switch 145E through interface 1 and egresses toward the broadcast controller's domain. Another broadcast controller provides a multicast route where the same group ingresses the switch through interface 2 and egresses toward another broadcast controller's domain. Here, the different broadcast controllers indicate the same group (they use the same IP multicast group address) ingresses through two different interfaces. However, a multicast group cannot ingress through two different interfaces.

In this scenario, supervisor 540 may pick the multicast route from one broadcast controller, at step 730B. For example, each broadcast controller may be given a priority/ranking, and the multicast route from the highest (or lowest) priority/ranking broadcast controller may be used (and the other conflicting multicast route(s) may be discarded). Another arbitration scheme may be based on time. For example, the earliest (or latest) in time multicast route received by switch 145 may be used and the later (or earlier) in time multicast route(s) received by switch 145 may be discarded.

In a further example, multicast routes include bandwidth information. Here, the broadcast controller (broadcast controller 110E-1 and/or 110E-2) expects a certain amount of bandwidth to be reserved for that multicast route (and hence broadcast/stream). The supervisor (supervisor 540) may select the multicast route specifying a higher bandwidth than the conflicting multicast routes, at step 730C.

Networking Device

Figure 8:
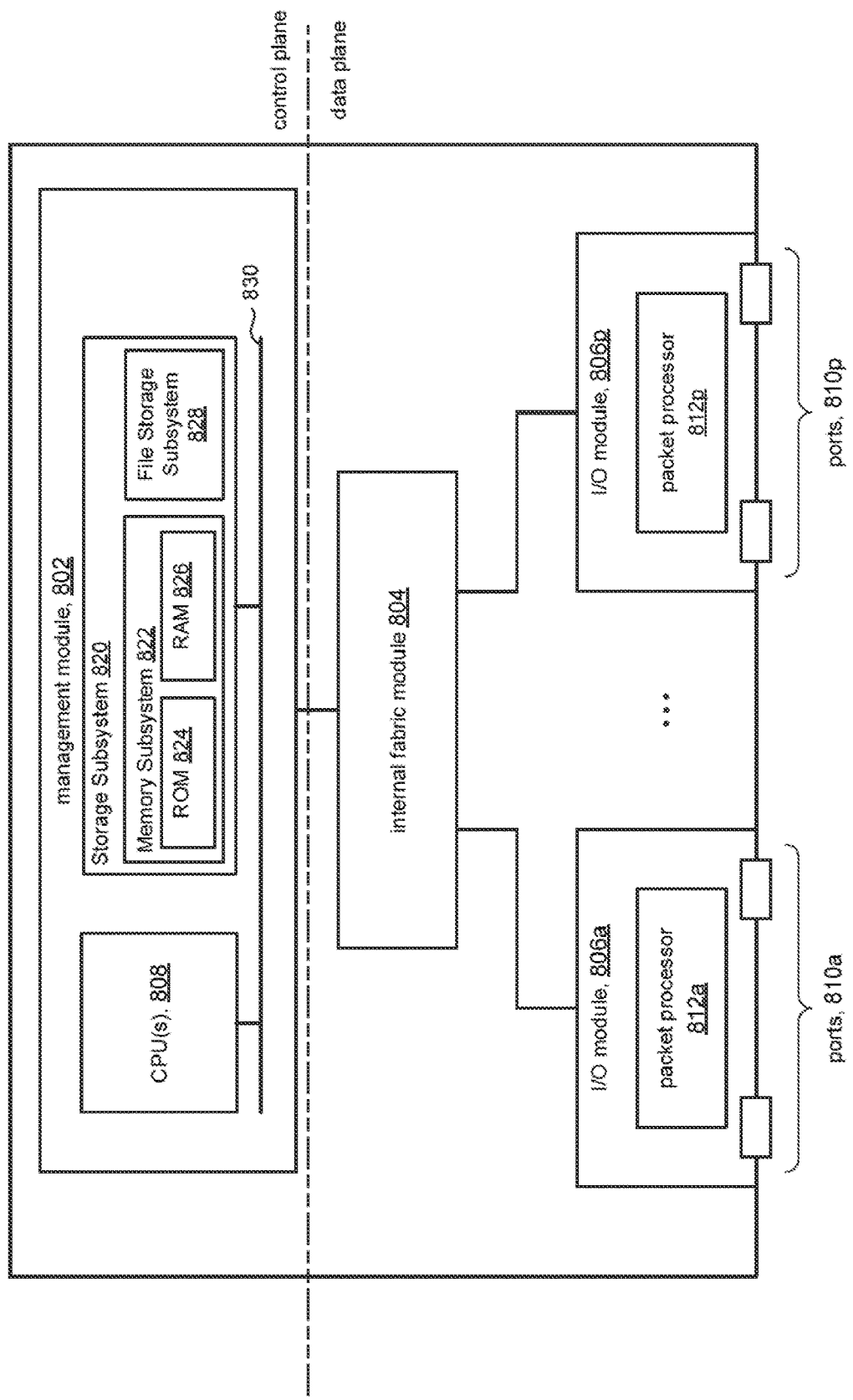
FIG. 8 shows an illustrative example of a networking device that can be adapted in accordance with the present disclosure.

FIG. 8 depicts an example of networking device 800 in accordance with some embodiments of the present disclosure. In some embodiments, networking device 800 can be a switch, such as the spine and leaf switches of the present technology. As shown, networking device 800 includes a management module 802, an internal fabric module 804, and a number of I/O modules 806a-806p. Management module 802 includes the control plane (also referred to as control layer or simply the CPU) of networking device 800 and can include one or more management CPUs 808 for managing and controlling operation of networking device 800 in accordance with the present disclosure. Each management CPU 808 can be a general-purpose processor, such as an Intel®/AMD® x86 or ARM® microprocessor, that operates under the control of software stored in a memory, such as random-access memory (RAM) 826. Control plane refers to all the functions and processes that determine which path to use, such a routing protocols, spanning tree, and the like.

Internal fabric module 804 and I/O modules 806a-806p collectively represent the data plane of networking device 800 (also referred to as data layer, forwarding plane, etc.). Internal fabric module 804 is configured to interconnect the various other modules of networking device 800. Each I/O module 806a-806p includes one or more input/output ports 810a-810p that are used by networking device 800 to send and receive network packets. Input/output ports 810a-810p are also known as ingress/egress. Each I/O module 806a-806p can also include a packet processor 812a-812p. Each packet processor 812a-812p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 802 includes one or more management CPUs 808 that communicate with storage subsystem 820 via bus subsystem 830. Other subsystems, such as a network interface subsystem (not shown in FIG. 8), may be on bus subsystem 830. Storage subsystem 820 includes memory subsystem 822 and file/disk storage subsystem 828 represent non-transitory computer-readable storage media that can store program code and/or data, which when executed by one or more management CPUs 808, can cause one or more management CPUs 808 to perform operations in accordance with embodiments of the present disclosure.

Memory subsystem 822 includes a number of memories including main RAM 826 for storage of instructions and data during program execution and read-only memory (ROM) 824 in which fixed instructions and data are stored. File storage subsystem 828 can provide persistent (i.e., non-volatile) storage for program and data files, and can include a magnetic or solid-state hard disk drive, and/or other types of storage media known in the art.

One or more management CPUs 808 can run a network operating system stored in storage subsystem 820. A network operating system is a specialized operating system for networking device 800 (e.g., a router, switch, firewall, and the like). For example, the network operating system may be Arista Extensible Operating System) (EOS®), which is a fully programmable and highly modular, Linux-based network operating system. Other network operating systems may be used.

Bus subsystem 830 can provide a mechanism for letting the various components and subsystems of management module 802 communicate with each other as intended. Although bus subsystem 830 is shown schematically as a single bus, alternative embodiments of the bus subsystem can utilize multiple busses.

What is claimed is:

1. A method in a switch comprising:
   instantiating, by a supervisor in the switch, a first controller client and a second controller client in a control plane of the switch;
   registering the first controller client with a first broadcast controller controlling a first broadcast network, the first broadcast network having a first source and a first plurality of receivers;
   registering the second controller client with a second broadcast controller controlling a second broadcast network, the second broadcast network having a second source and a second plurality of receivers;
   receiving a first multicast route through the first controller client;
   receiving a second multicast route through the second controller client; and
   programming at least one of the first multicast route and the second multicast route into a multicast routing information base.

2. The method of claim 1 further comprising resolving a conflict between the first multicast route and the second multicast route when the conflict is detected.

3. The method of claim 2 wherein the resolving the conflict includes merging the first multicast route and the second multicast route.

4. The method of claim 2 wherein the resolving the conflict includes using the first multicast route based on a predefined ranking of the first broadcast controller and second broadcast controller.

5. The method of claim 1 wherein:
   the first controller client is instantiated when a first command is received from the first broadcast controller, and
   the second controller client is instantiated when a second command is received from the second broadcast controller.

6. The method of claim 1 wherein:
   the first multicast route is received from a first media control service communicatively coupled to the first broadcast controller, and
   the second multicast route is received from a second media control service communicatively coupled to the second broadcast controller.

7. The method of claim 1 further comprising:
   providing first information to the first broadcast controller, wherein the first broadcast controller determines the first multicast route using the first information; and
   providing second information to the second broadcast controller, wherein the second broadcast controller determines the second multicast route using the second information.

8. A switch comprising:
   a processor; and
   a memory communicatively coupled to the processor, the memory storing instructions executable by the processor to perform a method, the method comprising:
      instantiating, by a supervisor in the switch, a first controller client and a second controller client in the switch;
      registering the first controller client with a first controller controlling a first broadcast network, the first broadcast network having a first media source and a first plurality of receivers;
      registering the second controller client with a second controller controlling a second broadcast network, the second broadcast network having a second media source and a second plurality of receivers;
      receiving, by the first controller client, a first route, wherein the first route is between the first media source and a first media receiver of the first plurality of receivers;
      receiving, by the second controller client, a second route, wherein the second route is between the second media source and a second media receiver of the second plurality of receivers; and
      programming at least one of the first route and the second route into a routing table.

9. The switch of claim 8 wherein:
   a first media control service is communicatively coupled to the first controller and the switch;
   the first media control service provides the first route;
   a second media control service is communicatively coupled to the second controller and the switch; and the second media control service provides the second route.

10. The switch of claim 9 wherein the method further comprises:
  providing first information to the first controller through the first media control service, wherein the first controller determines the first route using the first information; and
  providing second information to the second controller through the second media control service, wherein the second controller determines the second route using the second information.

11. The switch of claim 10 wherein:
  the first information includes information about at least one of the first media source and the first media receiver; and
  the second information includes information about at least one of the second media source and the second media receiver.

12. The switch of claim 8 wherein:
  the first route is in a first broadcast domain associated with the first controller; and
  the second route is in a second broadcast domain associated with the second controller.

13. The switch of claim 12 wherein:
  a first plurality of switches is communicatively coupled to the first media control service;
  the first media control service gathers information from the first plurality of switches to determine a topology of a first network;
  a second plurality of switches is communicatively coupled to the second media control service, and
  the second media control service gathers information from the second plurality of switches to determine a topology of a second network.

14. The switch of claim 8 wherein the processor is in a control plane of the switch.

15. A computer-readable, non-transitory storage medium having a program stored thereon, the program being executable by a processor to perform a method in a switch, the method comprising:
  instantiating, by a supervisor in the switch, a first controller client and a second controller client in a control plane of the switch;
  registering the first controller client with a first controller controlling a first broadcast network, the first broadcast network having a first media source and a first plurality of receivers;
  registering the second controller client with a second controller controlling a second broadcast network, the second broadcast network having a second media source and a second plurality of receivers;
  receiving a first route through the first controller client, wherein the first controller client is registered with the first controller;
  receiving a second route through the second controller client, wherein the second controller client is registered with the second controller; and
  programming at least one of the first route and the second route into a routing table.

16. The non-transitory storage medium of claim 15 wherein: the switch is communicatively coupled to the first media source; and at least one of the first route and the second route includes the first media source.

17. The non-transitory storage medium of claim 16 wherein the first media source provides at least one of audio and video data.

18. The non-transitory storage medium of claim 15 wherein the method further comprises resolving a conflict between the first route and the second route when the conflict is determined.

19. The non-transitory storage medium of claim 18 wherein the resolving the conflict includes merging the first route and the second route.

20. The non-transitory storage medium of claim 18 wherein the resolving the conflict includes using the first route based on a predefined ordering of broadcast controllers.

* * * * *